United States Patent

Suzuki et al.

[11] Patent Number: 5,886,835
[45] Date of Patent: *Mar. 23, 1999

[54] RELAY OPTICAL SYSTEM

[75] Inventors: Fumio Suzuki, Yokohama; Satoru Moriya, Noda, both of Japan

[73] Assignees: Nikon Corporation, Tokyo; Victor Company of Japan, Limited, Kanagawa, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 622,042
[22] Filed: Mar. 21, 1996

[30] Foreign Application Priority Data

Mar. 24, 1995 [JP] Japan .................. 7-091809

[51] Int. Cl.⁶ .................. G02B 9/58; G02B 9/00
[52] U.S. Cl. .................. 359/782; 359/740; 359/754
[58] Field of Search .................. 359/782, 755, 359/756, 650, 679, 434, 435, 423, 424, 754, 739, 740

[56] References Cited

U.S. PATENT DOCUMENTS

| | | | |
|---|---|---|---|
| 1,777,262 | 9/1930 | Hasselkus | 359/782 |
| 3,728,010 | 4/1973 | Mikami | 359/679 |

FOREIGN PATENT DOCUMENTS

| | | |
|---|---|---|
| SHO 47-7435 (B) | 3/1972 | Japan . |
| SHO 55-10883 (B) | 3/1980 | Japan . |
| SHO 58-1763 (B) | 1/1983 | Japan . |
| SHO 63-4217 (A) | 1/1988 | Japan . |
| SHO 63-109422 (A) | 5/1988 | Japan . |

Primary Examiner—Georgia Epps
Assistant Examiner—Jordan M. Schwartz
Attorney, Agent, or Firm—Klarquist Sparkman Campbell Leigh & Whinston, LLP

[57] ABSTRACT

A relay optical system is disclosed that comprises, in axial order from the object side, first, second, third, and fourth lens groups having a negative, a positive, a positive, and a negative refractive power, respectively. An aperture stop is between the second and third lens groups. Relative to the aperture stop, the first lens group is symmetrical with the fourth lens group and the second lens group is substantially symmetrical with the third lens group. The relay optical system fulfills at least the conditions:

$-0.3 < f/f1 < -0.1$ $0.5 < f/f2 < 1.1$ wherein f1 and f2 are the focal lengths of the first and second lens groups, respectively, and f is the overall focal length of the relay optical system.

18 Claims, 6 Drawing Sheets

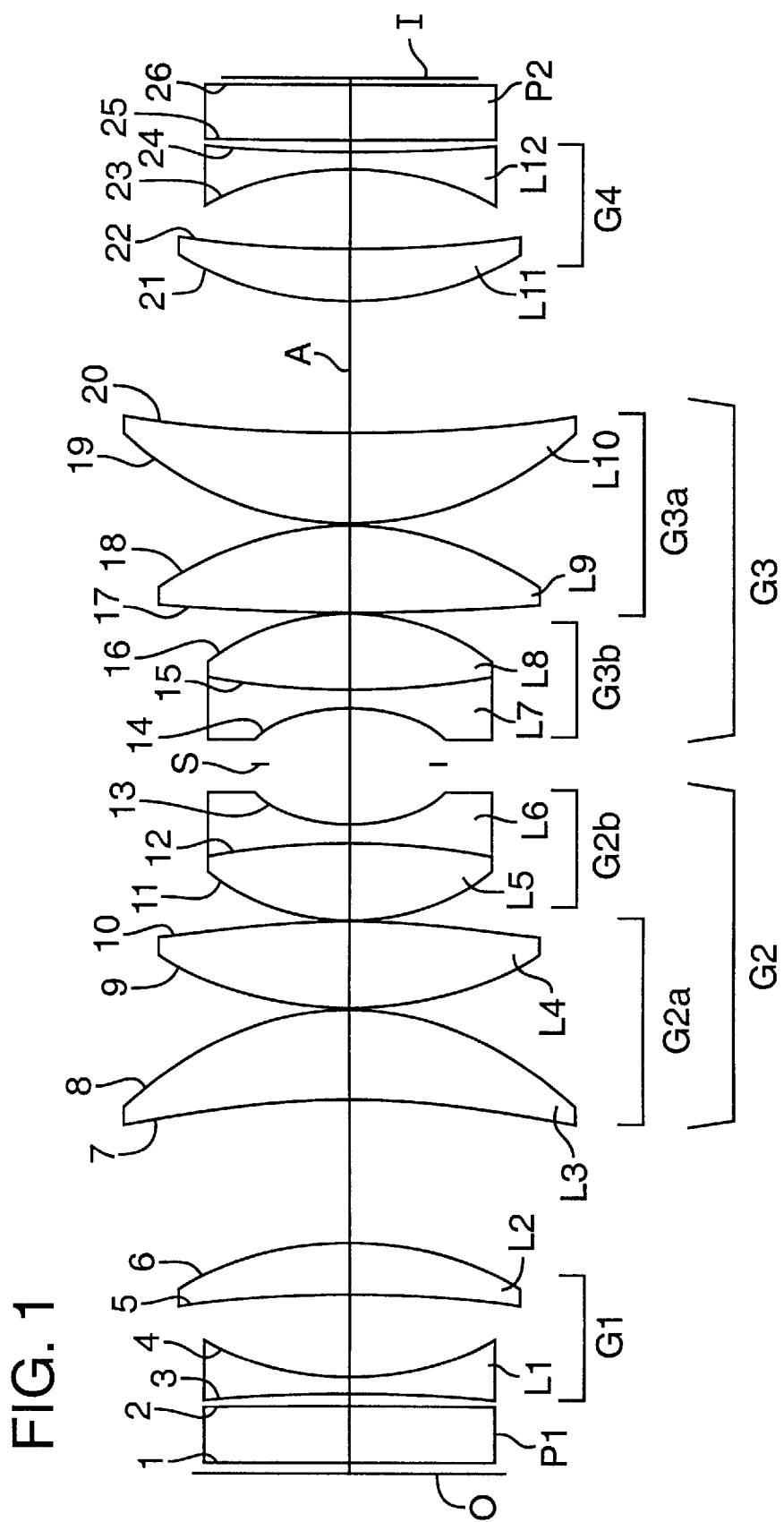

NA = 0.31

0.500
SPHERICAL
ABERRATION

Y' = 31.75

0.500
ASTIGMATISM

Y' = 31.75

2.000 (%)
DISTORTION

NA = 0.31   Y' = 31.75   Y' = 31.75

0.500           0.500           2.000 (%)
SPHERICAL   ASTIGMATISM   DISTORTION
ABERRATION

NA = 0.31   Y = 31.75   Y = 31.75

0.500　　　　0.500　　　　2.000 (%)
SPHERICAL   ASTIGMATISM   DISTORTION
ABERRATION

RELAY OPTICAL SYSTEM

FIELD OF THE INVENTION

This invention pertains to optical assemblies for use as optical relays. The invention especially pertains to lens assemblies for conducting video image information at virtually full magnification, particularly to an optically addressed spatial light modulator.

BACKGROUND OF THE INVENTION

Video projectors are known that employ a CRT (cathode-ray tube) or transmitting liquid crystal light valve as the source of a projected image. Also, high-definition versions of such image sources have been realized.

Unfortunately, conventional video projectors for such high-definition image sources are unsatisfactory especially due to the difficulty in achieving a desired high level of brightness and definition of the projected image using such projectors.

Video projectors have been realized that employ optically addressed spatial light modulators as a means for improving the brightness and definition of the projected image on a screen. In these systems, a video image is "written" on a liquid crystal layer by conducting an original image (formed on a CRT or analogous device) onto a spatial light modulator (SLM). Light from a light source is impinged on the liquid crystal layer "imprinted" with the image; light (containing the image) reflected from the liquid crystal layer is then projected onto a viewing screen using a projection lens.

To "write" the image on the spatial light modulator, an optical fiber array or optical relay is disposed between the image source and the spatial light modulator. Use of an optical fiber array as an image-conducting means advantageously is amenable to miniaturization. Unfortunately, however, an optical fiber array has the still unsolved problem of introducing "chicken wire" artifacts on the image and also is expensive.

Conventional optical relays can also be made small and can be used at full magnification. However, for optimal performance, the optical relay must be able to transmit a bright image in order to effectively drive the spatial light modulator. It has heretofore been very difficult to realize an optical relay that conducts a bright image and that produces high image quality at full magnification.

SUMMARY OF THE INVENTION

An object of the present invention is to provide a relay optical system that can brightly conduct an image, that can be made suitably small, and that produces a high image quality.

According to a representative general embodiment of the present invention, a relay optical system is provided that comprises, in order from the "object side" (i.e., side facing the CRT or other image-generating means) and proceeding along an optical axis: first, second, third, and fourth lens groups having a negative refractive power, a positive refractive power, a positive refractive power, and a negative refractive power, respectively. An aperture stop is situated between the second lens group and the third lens group, around which aperture stop the second lens group is symmetrical with the third lens group, and the first lens group is symmetrical with the fourth lens group. The relay optical system preferably fulfills the following conditions:

$-0.3 < f/f1 < -0.1$ $0.5 < f/f2 < 1.1$ wherein f1 is the focal length of the first lens group, f2 is the focal length of the second lens group and f is the overall focal length of the relay optical system.

Additional purposes, characteristics and benefits of this invention shall become clear in the following description, referring to the attached figures.

BRIEF DESCRIPTION OF THE DRAWINGS

FIG. 1 is an optical diagram depicting general aspects of a relay optical system according to the present invention, as well as specific aspects of Example Embodiment 1.

FIG. 2 includes several aberration graphs for Example Embodiment 1 at full-magnification (−1.0×); specifically.

FIG. 4 includes several aberration graphs for Example Embodiment 2 at full-magnification (−1.0×); specifically.

FIG. 6 includes several aberration graphs for Example Embodiment 3 at full-magnification (−1.0×); specifically.

DETAILED DESCRIPTION

Figure 2A:
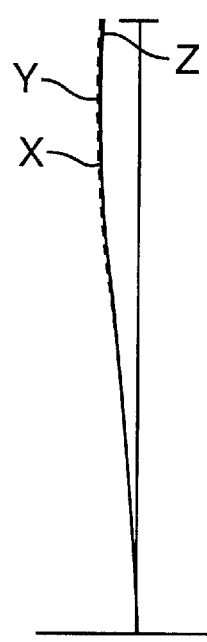
FIG. 2A is a plot of spherical aberration.

A "positive" distance or direction along an optical axis extends from left to right in an optical diagram; a "negative" distance or direction extends from right to left.

The "curvature radius" of an optical surface (such as the surface of a lens element) is "positive" whenever the center of curvature lies to the right of the surface, and "negative" whenever the center of curvature lies to the left of the surface.

An "interfacial distance" is the distance, along an optical axis, between adjacent optical surfaces on separate lens elements.

Referring to FIG. 1, a preferred embodiment of a relay optical system according to the present invention comprises, on an optical axis A and proceeding from the object side, a first lens group G1 having a negative refractive power, a second lens group G2 having a positive refractive power, a third lens group G3 having a positive refractive power, and a fourth lens group G4 having a negative refractive power. An aperture stop S is disposed between the second lens group G2 and the third lens group G3, around which aperture stop the first lens group G1 is symmetrical with the fourth lens group G4, and the second lens group G2 is symmetrical with the third lens group G3.

Referring further to FIG. 1, since the first lens group G1 (which is closest to the object side) and the fourth lens group G4 (which is closest to the image side) both have a negative refractive power, these lens groups perform as field flatteners to primarily correct off-axis aberration, especially Petzval's sum (field curvature). Since the second lens group G2 and the third lens group G3 both have a positive refractive power, these lens groups bear most of the overall refractive power of the relay optical system, and correct axial aberrations.

Thus, relay optical systems according to the present invention have an optical configuration that corrects aberrations well and is able to discriminate between axial and off-axis aberrations. Because the relay optical system as a whole is configured symmetrically around the aperture stop S, no coma, distortion, or transverse chromatic aberration is produced when the relay optical system is used at, or nearly at, full magnification.

A relay optical system according to the present invention preferably satisfies the following Conditional Expressions (1) and (2):

$$-0.3 < f/f1 < -0.1 \qquad (1)$$

$$0.5 < f/f2 < 1.1 \qquad (2)$$

wherein f is the overall focal length of the relay optical system, f1 is the focal length of the first lens group G1, and f2 is the focal length of second lens group G2.

Conditional Expression (1) specifies a preferred range for f/f1, and is related to the correction of off-axis aberrations, especially Petzval's sum (field curvature). Exceeding the upper limit of Conditional Expression (1) causes the refractive power of the first lens group G1 to be too weak relative to the overall refractive power of the relay optical system. This increases the Petzval's sum of the relay optical system and increases the difficulty of correcting field curvature. I.e., exceeding the upper limit of Conditional Expression (1) increases the burden on the second lens group for correcting Petzval's sum, which diminishes degrees of freedom in the second and third lens groups for correcting axial aberrations, thus making it difficult to correct spherical aberrations.

Falling below the lower limit of Conditional Expression (1) causes the refractive power of the first lens group G1 to be too great relative to the overall refractive power of the relay optical system. This, in turn, increases the Petzval's sum in the negative direction, making it difficult to correct field curvature.

Conditional Expression (2) specifies a preferred range for f/f2, and is related to the correction of axial aberrations. Exceeding the upper limit of Conditional Expression (2) causes the refractive power of the second lens group G2 to be too great relative to the overall refractive power of the relay optical system, making it difficult to correct spherical aberration. Falling below the lower limit of Conditional Expression (2) causes the refractive power of the second lens group G2 to be too weak relative to the overall refractive power of the relay optical system. This, in turn, necessitates making the refractive power of the first lens group G1 too strong relative to, for example, the second lens group G2, thereby making it difficult to correct field curvature.

Preferably, the second lens group G2 comprises a front lens subgroup G2a having a positive refractive power, and a rear lens subgroup G2b having a negative refractive power. In such an instance, the relay optical system satisfies Conditional Expression (3):

$$-0.75 < f2/f2b < -0.45 \qquad (3)$$

wherein f2b is the focal length of the rear lens sub-group G2b.

Conditional Expression (3) specifies a power configuration for the second lens group G2, comprising front and rear lens subgroups G2a, G2b, respectively, and particularly specifies a preferred range for f2/f2b. Exceeding the upper limit of Conditional Expression (3) causes the refractive power of the rear lens subgroup G2b to be too weak. This excessively weakens the ability of the rear lens subgroup G2b, compared to the front lens subgroup G2a, to correct axial aberrations, thereby making it difficult to correct spherical aberration. Falling below the lower limit of Conditional Expression (3) causes the refractive power of the rear lens subgroup G2b to be excessively increased in the positive direction, making the surface curvature of the lens element in the rear lens subgroup G2b that is closest to the aperture stop S too small. This produces coma aberration which is difficult to correct.

As discussed above, the relay optical system is preferably constructed so as to be symmetrical around the aperture stop S. Thus, whenever the second lens group G2 comprises a front lens subgroup G2a having a positive refractive power and a rear lens subgroup G2b having a negative refractive power, it is preferred that the third lens group G3 comprise a front lens subgroup G3b having a negative refractive power and a rear lens subgroup G3a having a positive refractive power. The ratio of the focal length f3 of the third lens group G3 to the focal length f3b of the front lens subgroup G3b then preferably satisfies the following:

$$-0.75 < f3/f3b < -0.45$$

It is also preferred that a relay optical system according to the present invention satisfy the following Conditional Expression (4) in order to exhibit even better optical performance:

$$0.85 < \Sigma D/OWDa < 1 \qquad (4)$$

wherein $\Sigma D$ is the axial distance (lens length) from the lens surface in the first lens group G1 that is closest to the object side to the lens surface in the fourth lens group G4 that is closest to the image side, and (referring to FIG. 1) OWDa is the axial distance in air from the object O to the image I whenever the optical relay system is being used at full magnification and no optical elements (such as flats) are present between the most objectwise lens element L1 and the object O and between the most imagewise lens element L12 and the image I.

Conditional Expression (4) specifies a preferred relationship between the overall distance from the object O to the image I and the overall lens length during full-magnification use, and particularly specifies a preferred optical configuration of the first and fourth lens groups G1, G4 for obtaining excellent optical performance. Exceeding the upper limit of Conditional Expression (4) causes the overall lens length to be greater than the overall distance in air from the object O to the image I which makes the optical relay system incapable of being used for its intended purpose. Falling below the lower limit of Conditional Expression (4) causes the height, from the optical axis A, of off-axis light flux passing through the first lens group G1 and the fourth lens group G4 to be too low, and axial light flux passing through the first lens group G1 and the fourth lens group G4 to be. too great. This is undesirable as it undesirably increases the difficulty of correcting off-axis aberrations at the first lens group G1 and the fourth lens group G4.

Additionally, referring further to FIG. 1, the first lens group G1 preferably comprises a negative lens element L1 axially disposed closest to the object O, and a positive meniscus lens element L2 disposed imagewise of the lens element L1. The negative lens element L1 serves primarily as a field flattener, and disposing the lens element L1 closest to the object O facilitates the primary function of this lens element.

The front lens subgroup G2a preferably comprises two positive lens elements L3, L4 having convex surfaces oriented toward each other. This configuration enables off-axis light flux to be slightly refracted, making it possible to suppress the production of aberrations.

Because the relay optical system according to the present invention preferably is symmetrical around the aperture stop S, the function of the fourth lens group G4 is substantially the same as the function of the first lens group G1, and the function of the front lens subgroup G2a is substantially the same as the function of the rear lens subgroup G3a.

EXAMPLE EMBODIMENT 1

This Example Embodiment, specific aspects of which are shown in FIG. 1, comprises, in order from the object side, a first lens group G1, a second lens group G2 including a front lens subgroup G2a and a rear lens subgroup G2b, a third lens group G3 including a front lens subgroup G3b and a rear lens subgroup G3a, and a fourth lens group G4. The first lens group G1 comprises a biconcave lens element L1 and a positive meniscus lens element L2 having a concave surface 5 oriented toward the object side. The front lens subgroup G2a comprises a positive meniscus lens L3 having a concave surface 7 oriented toward the object side, and a biconvex lens element L4. The rear lens subgroup G2b comprises a negative cemented lens including a biconvex lens element L5 and a biconcave lens element L6. The front lens subgroup G3b comprises a negative cemented lens including a biconcave lens element L7 and a biconvex lens element L8. The rear lens subgroup G3a comprises a biconvex lens element L9, and a positive meniscus lens element L10 having a convex surface 19 oriented toward the object side. The fourth lens group G4 comprises a positive meniscus lens element L11 having a convex surface 21 oriented toward the object side, and a biconcave lens element L12.

An aperture stop S is disposed between the second lens group G2 and the third lens group G3, and the relay optical system shown in FIG. 1 is configured symmetrically around this aperture stop S.

Numerical data regarding Example Embodiment 1 are listed in Table 1, below. In Table 1, f, f1, f2, f2b, $\Sigma D$, and OWDa are as defined above. $\beta$ is the magnification and NA is the numerical aperture of the relay optical system, and D0 is the axial distance from the object O to the objectwise surface 3 of the first lens element L1. Lens surface numbers are in order from objectwise to imagewise. Distance and radius dimensions are in millimeters.

In FIG. 1, parallel-plane plates P1, P2, corresponding to the respective face plate of, for example, a CRT and a spatial light modulator (SLM), are axially included objectwise of the first lens group G1 and imagewise of the fourth lens group G4, respectively. Since aberration correction is performed assuming the presence of the parallel-plane plates P1, P2, data concerning the plates P1, P2 are included in Table 1. OWD is the overall distance in air from the object O to the image I whenever the optical relay system is used at unity magnification and the plates P1 and P2 are axially situated as shown in FIG. 1. OWDa is a corresponding axial distance when the plates P1, P2 are absent.

Further with respect to Table 1, the refractive index (X) is with 710-nm wavelength light, the refractive index (Y) is with 680-nm wavelength light, and the refractive index (Z) is with 740-nm wavelength light.

TABLE 1 f = 51.72 mm  OWD = 320.02 mm
$\beta$ = -1.0 X  D0 = 1.01 mm
NA = 0.32

| Surface No. | Curvature Radius | Interfacial Distance | Refractive Index (X) | Refractive Index (Y) | Refractive Index (Z) |
|---|---|---|---|---|---|
| 1 | ∞ | 12.70 | 1.512797 | 1.513612 | 1.512059 |
| 2 | ∞ | 3.30 | | | |
| 3 | -500.24596 | 4.00 | 1.790930 | 1.793681 | 1.788511 |
| 4 | 77.32817 | 18.50 | | | |
| 5 | -294.33699 | 12.00 | 1.728609 | 1.730960 | 1.726541 |
| 6 | -87.59558 | 31.20 | | | |
| 7 | -354.84245 | 21.00 | 1.706538 | 1.707841 | 1.705364 |
| 8 | -78.90940 | 0.30 | | | |
| 9 | 82.10719 | 20.00 | 1.706538 | 1.707841 | 1.705364 |
| 10 | -734.20847 | 0.30 | | | |
| 11 | 57.23681 | 18.00 | 1.584404 | 1.585357 | 1.583545 |
| 12 | -186.62100 | 4.00 | 1.790930 | 1.793681 | 1.788511 |
| 13 | 37.52125 | 13.70 | | | |
| S | ∞ | 13.70 | | | |
| 14 | -37.52125 | 4.00 | 1.790930 | 1.793681 | 1.788511 |
| 15 | 186.62100 | 18.00 | 1.584404 | 1.585357 | 1.583545 |
| 16 | -57.23681 | 0.30 | | | |
| 17 | 734.20847 | 20.00 | 1.706538 | 1.707841 | 1.705364 |
| 18 | -82.10719 | 0.30 | | | |
| 19 | 78.90940 | 21.00 | 1.706538 | 1.707841 | 1.705364 |
| 20 | 354.84245 | 31.20 | | | |
| 21 | 87.59558 | 12.00 | 1.728609 | 1.730960 | 1.726541 |
| 22 | 294.33699 | 18.50 | | | |
| 23 | -77.32817 | 4.00 | 1.790930 | 1.793681 | 1.788511 |
| 24 | 500.24596 | 3.30 | | | |
| 25 | ∞ | 12.70 | 1.512797 | 1.513612 | 1.512059 |
| 26 | ∞ | 1.01 | | | |

Figure 2B:
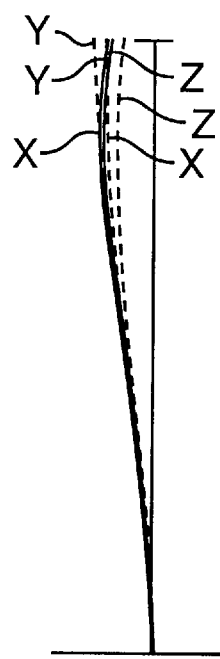
FIG. 2B is a plot of astigmatism.
Figure 2C:
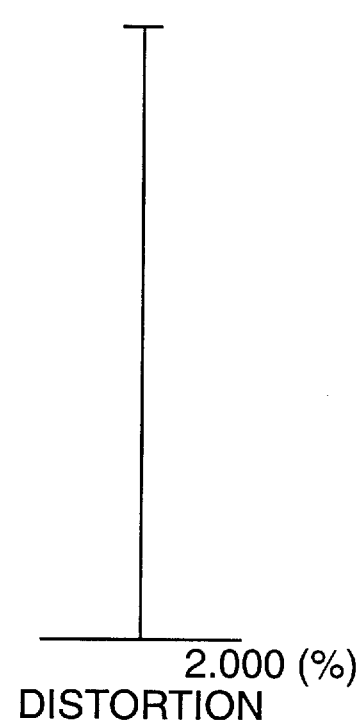
FIG. 2C is a plot of distortion.

Values for Conditional Expressions:

f1 = -260.19 mm  (1) f/f1 = -0.1988
f2 = 69.59 mm  (2) f/f2 = 0.7432
f2b = -111.51 mm  (3) f2/f2b = -0.6241
$\Sigma D$ = 286.00 mm  (4) $\Sigma D$/OWDa = 0.9184
OWDa = 311.40 mm FIG. 2 depicts aberration plots for Example Embodiment 1 with the transverse magnification $\beta$ at full-magnification (-1.0x). FIG. 2A shows spherical aberration, FIG. 2B shows astigmatism, and FIG. 2C shows distortion.

In FIG. 2, NA is the numerical aperture, Y' is the image height, X designates aberrations at 710 nm, Y indicates aberrations at 680 nm, and Z indicates aberrations at 740 nm. In FIG. 2B, the solid line corresponds to the sagittal image surface and the dotted line corresponds to the meridional image surface. In FIG. 2A, the dotted line corresponds to the sine condition.

As is clear from FIGS. 2A–2C, Example Embodiment 1 has superior optical characteristics in which all aberrations are well corrected.

EXAMPLE EMBODIMENT 2

Figure 3:
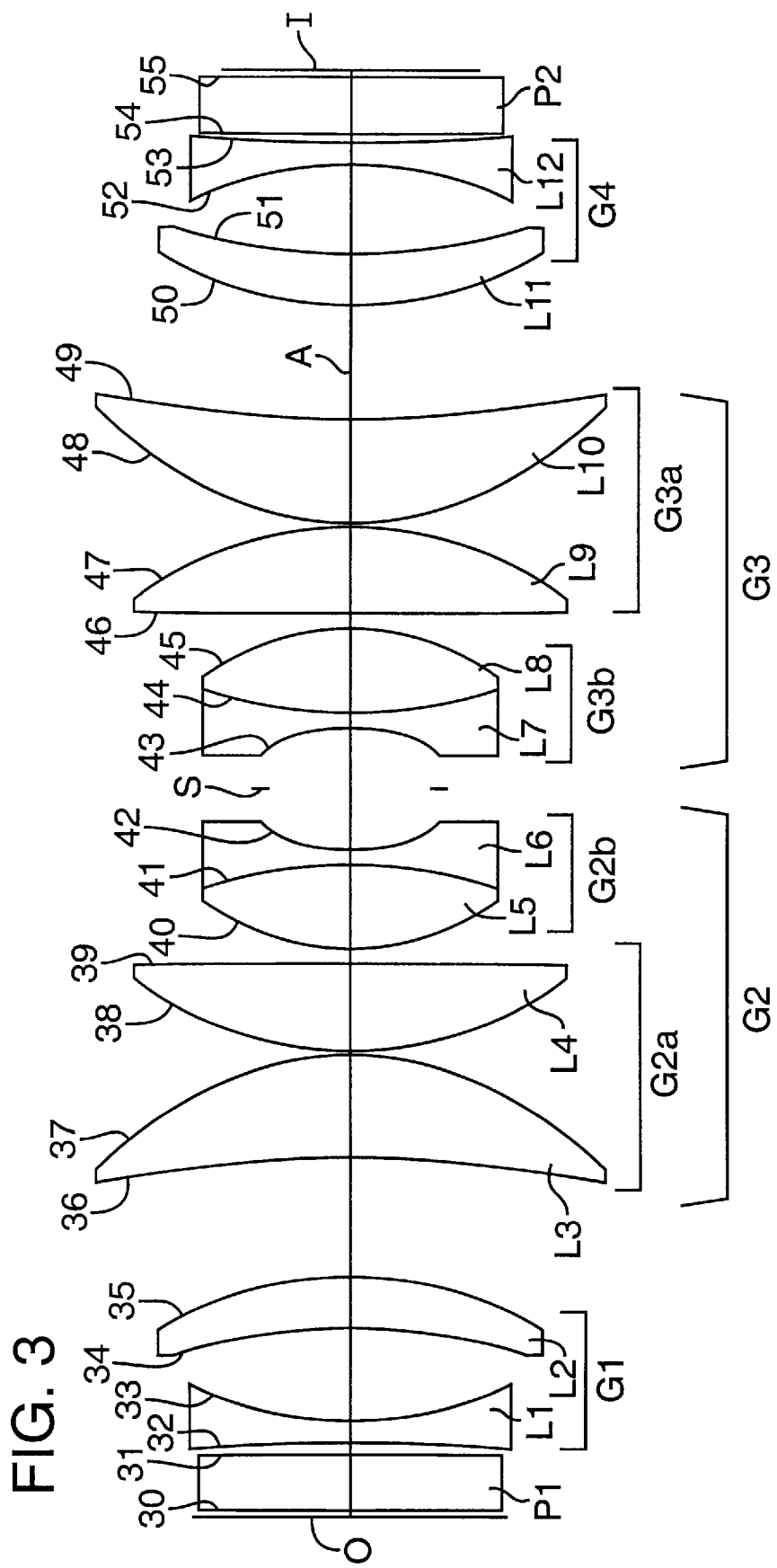
FIG. 3 is an optical diagram depicting specific aspects of Example Embodiment 2.

This Example Embodiment, specific aspects of which are shown in FIG. 3, comprises, in order from the object side, a first lens group G1, a second lens group G2 including a front lens subgroup G2a and a rear lens subgroup G2b, a third lens group G3 including a front lens subgroup G3b and a rear lens subgroup G3a, and a fourth lens group G4. The first lens group G1 comprises a biconcave lens element L1 and a positive meniscus lens element L2 having a concave surface 34 oriented toward the object side. The front lens subgroup G2a comprises a positive meniscus lens L3 having a concave surface 36 oriented toward the object side, and a biconvex lens element L4. The rear lens subgroup G2b comprises a negative cemented lens including a biconvex lens element L5 and a biconcave lens element L6. The front lens subgroup G3b comprises a negative cemented lens including a biconcave lens element L7 and a biconvex lens element L8. The rear lens subgroup G3a comprises a biconvex lens element L9, and a positive meniscus lens element L10 having a convex surface 48 oriented toward the object side. The fourth lens group G4 comprises a positive meniscus lens element L11 having a convex surface 50 oriented toward the object side, and a biconcave lens element L12.

An aperture stop S is disposed between the second lens group G2 and the third lens group G3, and the relay optical system shown in FIG. 3 is configured symmetrically around this aperture stop S.

Numerical data regarding Example Embodiment 2 are listed in Table 2, below. In Table 2, f, f1, f2, f2b, ΣD, and OWDa are as defined above. β is the magnification and NA is the numerical aperture of the relay optical system, and D0 is the axial distance from the object O to the objectwise surface 32 of the first lens element L1. Lens surface numbers are in order from objectwise to imagewise. Distance and radius dimensions are in millimeters.

In FIG. 2, parallel-plane plates P1, P2, corresponding to the respective face plate of, for example, a CRT and a spatial light modulator (SLM), are axially included objectwise of the first lens group G1 and imagewise of the fourth lens group G4, respectively. Since aberration correction is performed assuming the presence of the parallel-plane plates P1, P2, data concerning the plates P1, P2 are included in Table 2. OWD is the overall distance in air from the object O to the image I whenever the optical relay system is used at unity magnification and the plates P1 and P2 are axially situated as shown in FIG. 2. OWDa is a corresponding axial distance when the plates P1, P2 are absent.

Further with respect to Table 2, the refractive index (X) is with 710-nm wavelength light, the refractive index (Y) is with 680-nm wavelength light, and the refractive index (Z) is with 740-nm wavelength light.

TABLE 2 f = 59.03 mm
β = -1.0 X
NA = 0.32
OWD = 319.98 mm
D0 = 0.99 mm

| Surface No. | Curvature Radius | Interfacial Distance | Refractive Index (X) | Refractive index (Y) | Refractive Index (Z) |
|---|---|---|---|---|---|
| 30 | ∞ | 12.70 | 1.512802 | 1.513615 | 1.512066 |
| 31 | ∞ | 2.00 | | | |
| 32 | -684.98492 | 5.00 | 1.790843 | 1.793622 | 1.788390 |
| 33 | 90.83981 | 19.90 | | | |
| 34 | -155.98445 | 12.00 | 1.739564 | 1.741513 | 1.737835 |
| 35 | -81.13535 | 26.40 | | | |
| 36 | -291.02215 | 22.00 | 1.765243 | 1.766750 | 1.763894 |
| 37 | -78.87721 | 0.50 | | | |
| 38 | 80.15732 | 20.00 | 1.765243 | 1.766750 | 1.763894 |
| 39 | -1340.72570 | 3.00 | | | |
| 40 | 57.57686 | 18.00 | 1.584386 | 1.585345 | 1.583521 |
| 41 | -137.15029 | 4.00 | 1.790843 | 1.793622 | 1.788390 |
| 42 | 36.71642 | 13.50 | | | |
| S | ∞ | 13.50 | | | |
| 43 | -36.71642 | 4.00 | 1.790843 | 1.793622 | 1.788390 |
| 44 | 137.15029 | 18.00 | 1.584386 | 1.585345 | 1.583521 |
| 45 | -57.57686 | 3.00 | | | |
| 46 | 1340.72570 | 20.00 | 1.7652243 | 1.766750 | 1.763894 |
| 47 | -80.15732 | 9.50 | | | |
| 48 | 78.87721 | 22.00 | 1.765243 | 1.766750 | 1.763894 |
| 49 | 291.02215 | 26.40 | | | |
| 50 | 81.13535 | 12.00 | 1.739564 | 1.741513 | 1.737835 |

TABLE 2-continued f = 59.03 mm
β = -1.0 X
NA = 0.32
OWD = 319.98 mm
D0 = 0.99 mm

| Surface No. | Curvature Radius | Interfacial Distance | Refractive Index (X) | Refractive index (Y) | Refractive Index (Z) |
|---|---|---|---|---|---|
| 51 | 155.98445 | 19.90 | | | |
| 52 | -90.83981 | 5.00 | 1.790843 | 1.793622 | 1.788390 |
| 53 | 684.98492 | 2.00 | | | |
| 54 | ∞ | 12.70 | 1.512802 | 1.513615 | 1.512066 |
| 55 | ∞ | 0.99 | | | |

Values for Conditional Expressions:

f1 = -273.21 mm
f2 = 64.42 mm
f2b = -101.90 mm
ΣD = 288.60 mm
OWDa = 311.38 mm
(1) f/f1 = 0.2161
(2) F/f2 = 0.9164
(3) f2/f2b = -0.6322
(4) ΣD/OWDa = 0.9268

Figure 4A:
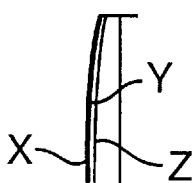
FIG. 4A is a plot of spherical aberration.
Figure 4B:
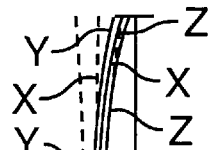
FIG. 4B is a plot of astigmatism.
Figure 4C:
FIG. 4C is a plot of distortion.

FIG. 4 depicts aberration plots for Example Embodiment 2 with the transverse magnification β at full-magnification (-1.0×). FIG. 4A shows spherical aberration, FIG. 4B shows astigmatism, and FIG. 4C shows distortion.

In FIG. 4, NA is the numerical aperture, Y' is the image height, X designates aberrations at 710 nm, Y indicates aberrations at 680 nm, and Z indicates aberrations at 740 nm. In FIG. 4B, the solid line corresponds to the sagittal image surface and the dotted line corresponds to the meridional image surface. In FIG. 4A, the dotted line corresponds to the sine condition.

As is clear from FIGS. 4A–4C, Example Embodiment 2 has superior optical characteristics in which all aberrations are well corrected.

EXAMPLE EMBODIMENT 3

Figure 5:
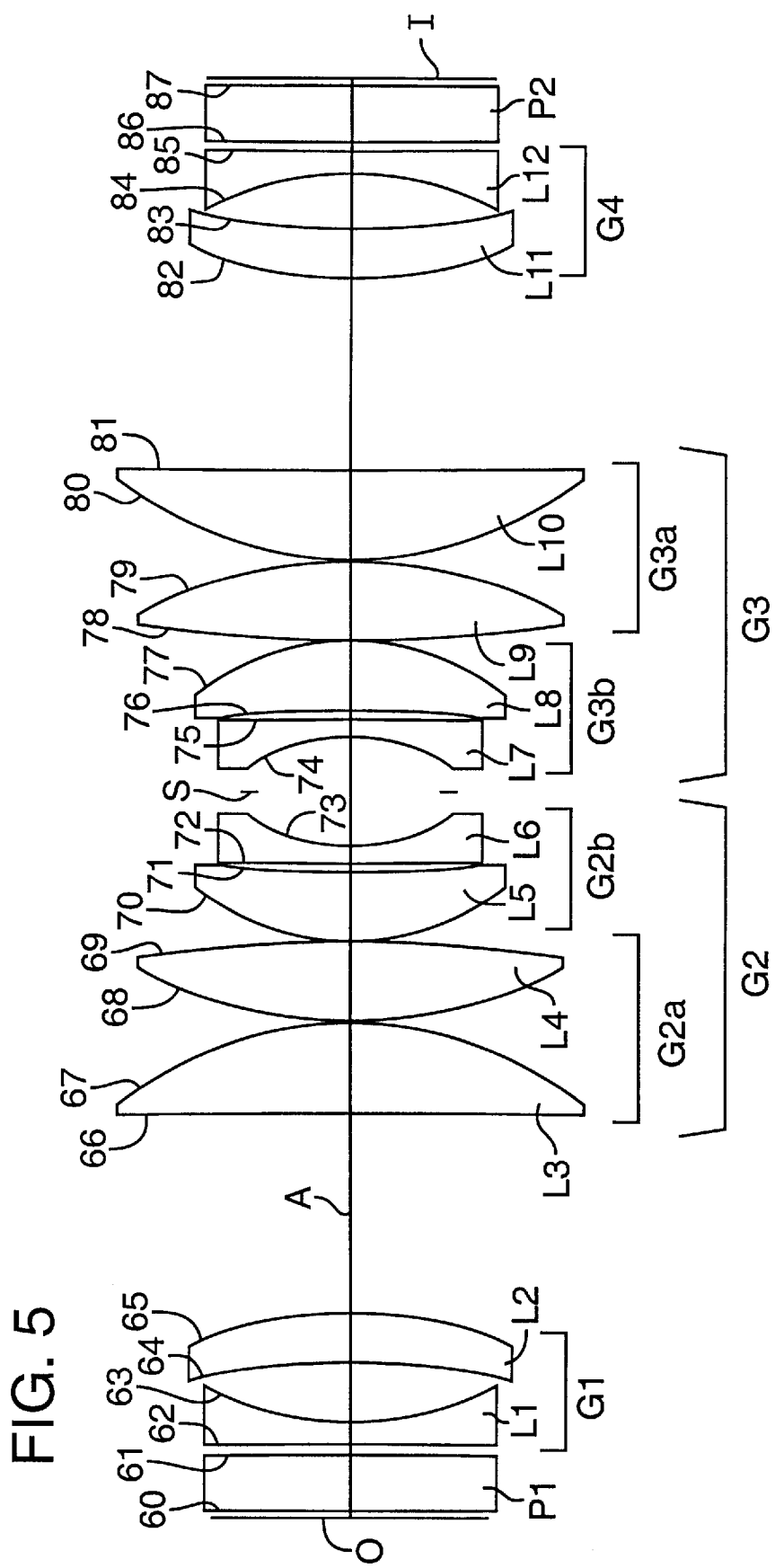
FIG. 5 is an optical diagram depicting specific aspects of Example Embodiment 3.

This Example Embodiment, specific aspects of which are shown in FIG. 5, comprises, in order from the object side, a first lens group G1, a second lens group G2 including a front lens subgroup G2a and a rear lens subgroup G2b, a third lens group G3 including a front lens subgroup G3b and a rear lens subgroup G3a, and a fourth lens group G4. The first lens group G1 comprises a negative meniscus lens element L1 having a convex surface 60 oriented toward the object side, and a positive meniscus lens element L2 having a concave surface 64 oriented toward the object side. The front lens subgroup G2a comprises a positive meniscus lens L3 having a concave surface 66 oriented toward the object side, and a biconvex lens element L4. The rear lens subgroup G2b comprises a positive meniscus lens element L5 having a convex surface 70 oriented toward the object side, and a negative meniscus lens element L6 having a convex surface 72 oriented toward the object side. The front lens subgroup G3b comprises a negative meniscus lens element L7 having a concave surface 74 oriented toward the object side, and a positive meniscus lens element L8 having a concave surface oriented toward the object side. The rear lens subgroup G3a comprises a biconvex lens element L9, and a positive meniscus lens element L10 having a convex surface 80 oriented toward the object side. The fourth lens group G4 comprises a positive meniscus lens element L11 having a convex surface 82 oriented toward the object side, and a negative meniscus lens element having a concave surface 84 oriented toward the object side.

An aperture stop S is disposed between the second lens group G2 and the third lens group G3, and the relay optical system shown in FIG. 5 is configured symmetrically around this aperture stop S.

Numerical data regarding Example Embodiment 3 are listed in Table 3, below. In Table 3, f, f1, f2, f2b, ΣD, and OWDa are as defined above. β is the magnification and NA is the numerical aperture of the relay optical system, and D0 is the axial distance from the object O to the objectwise surface 62 of the first lens element L1. Lens surface numbers are in order from objectwise to imagewise. Distance and radius dimensions are in millimeters.

In FIG. 3, parallel-plane plates P1, P2, corresponding to the respective face plate of, for example, a CRT and a spatial light modulator (SLM), are axially included objectwise of the first lens group G1 and imagewise of the fourth lens group G4, respectively. Since aberration correction is performed assuming the presence of the parallel-plane plates P1, P2, data concerning the plates P1, P2 are included in Table 3. OWD is the overall distance in air from the object O to the image I whenever the optical relay system is used at unity magnification and the plates P1 and P2 are axially situated as shown in FIG. 3. OWDa is a corresponding axial distance when the plates P1, P2 are absent.

Further with respect to Table 3, the refractive index (X) is with 710-nm wavelength light, the refractive index (Y) is with 680-nm wavelength light, and the refractive index (Z) is with 740-nm wavelength light.

TABLE 3 f = 46.86 mm
β = −1.0 X
NA = 0.32
OWD = 320.04 mm
D0 = 1.02 mm

| Surface No. | Curvature Radius | Interfacial Distance | Refractive Index (X) | Refractive index (Y) | Refractive Index (Z) |
|---|---|---|---|---|---|
| 60 | ∞ | 12.70 | 1.512802 | 1.513615 | 1.512066 |
| 61 | ∞ | 2.00 | | | |
| 62 | 3588.45700 | 5.00 | 1.790843 | 1.793622 | 1.788390 |
| 63 | 69.81578 | 12.80 | | | |
| 64 | −173.60419 | 11.00 | 1.745850 | 1.748013 | 1.743937 |
| 65 | −87.04525 | 44.50 | | | |
| 66 | 1934.18480 | 19.00 | 1.690665 | 1.691901 | 1.689552 |
| 67 | −88.92216 | 0.20 | | | |
| 68 | 100.55292 | 18.00 | 1.690665 | 1.6919.01 | 1.689552 |
| 69 | −329.89164 | 0.20 | | | |
| 70 | 57.58631 | 16.00 | 1.584386 | 1.585345 | 1.583521 |
| 71 | 331.54986 | 1.50 | | | |
| 72 | 1345.02600 | 4.00 | 1.790843 | 1.793622 | 1.788390 |
| 73 | 40.76241 | 12.10 | | | |
| S | ∞ | 12.10 | | | |
| 74 | −40.76241 | 4.00 | 1.790843 | 1.793622 | 1.788390 |
| 75 | −1345.02600 | 1.50 | | | |
| 76 | −331.54986 | 136.00 | 1.584386 | 1.585345 | 1.583521 |
| 77 | −57.58631 | 0.20 | | | |
| 78 | 329.89164 | 18.00 | 1.690665 | 1.691901 | 1.689552 |
| 79 | −100.55292 | 0.20 | | | |
| 80 | 88.92216 | 19.00 | 1.690665 | 1.691901 | 1.689552 |
| 81 | 1934.18480 | 44.50 | | | |
| 82 | 87.04525 | 11.00 | 1.745850 | 1.748013 | 1.743937 |
| 83 | 173.60419 | 12.80 | | | |
| 84 | −69.81578 | 5.00 | 1.790843 | 1.793622 | 1.788390 |
| 85 | −3588.45700 | 2.00 | | | |
| 86 | ∞ | 12.70 | 1.512802 | 1.513615 | 1.512066 |
| 87 | ∞ | 1.02 | | | |

TABLE 3-continued f = 46.86 mm
β = −1.0 X
NA = 0.32
OWD = 320.04 mm
D0 = 1.02 mm

| Surface No. | Curvature Radius | Interfacial Distance | Refractive Index (X) | Refractive index (Y) | Refractive Index (Z) |
|---|---|---|---|---|---|

Values for Conditional Expressions:

f1 = −186.58 mm
f2 = 70.84 mm
f2b = −130.14 mm
ΣD = 288.60 mm
OWDa = 311.43 mm
(1) f/f1 = −0.2512
(2) F/f2 = 0.6615
(3) f2/f2b = −0.5444
(4) ΣD/OWDa = 0.9267

Figure 6A:
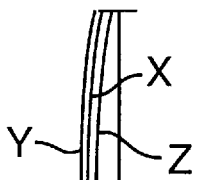
FIG. 6A is a plot of spherical aberration.
Figure 6B:
FIG. 6B is a plot of astigmatism.
Figure 6C:
FIG. 6C is a plot of distortion.

FIG. 6 depicts aberration plots for Example Embodiment 3 with the transverse magnification O at full-magnification (−1.0×). FIG. 6A shows spherical aberration, FIG. 6B shows astigmatism, and FIG. 6C shows distortion.

In FIG. 6, NA is the numerical aperture, Y' is the image height, X designates aberrations at 710 nm, Y indicates aberrations at 680 nm, and Z indicates aberrations at 740 nm. In FIG. 6B, the solid line corresponds to the sagittal image surface and the dotted line corresponds to the meridional image surface. In FIG. 6A, the dotted line corresponds to the sine condition.

As is clear from FIGS. 6A–6C, Example Embodiment 3 has superior optical characteristics in which all aberrations are well corrected.

Based on the foregoing, relay optical systems in accordance with the present invention can brightly conduct images and achieve high image-forming performance.

The aforementioned embodiments are intended, at most, to clarify the technical content of this invention. This invention can be variously modified within the intent of this invention and the scope described in the claims, without being narrowly interpreted so as to be limited to the aforementioned embodiments.

What is claimed is:

1. A relay optical system, comprising in order from the object side to the image side:

(a) first, second, third, and fourth lens groups, the second and third lens groups each having a positive refractive power and the first and fourth lens groups each having a negative refractive power;

(b) an aperture stop disposed between the second and third lens groups, wherein the second lens group comprises a concave surface, facing the aperture stop, that is closest to the image side of all lens surfaces in the second lens group, and the third lens group comprises a concave surface, facing the aperture stop, that is closest to the object side of all lens surfaces in the third lens group;

(c) relative to the aperture stop, the first lens group being symmetrical with the fourth lens group and the second lens group being symmetrical with the third lens group; and (d) the relay optical system having a focal length f, the first lens group having a focal length f1, and the second lens group having a focal length f2, the relay optical system satisfying the following conditions:

0.3<f/f1<-0.1
0.5<f/f2<1.1; and
0.85<ΣD/OWDa<1 wherein ΣD is the axial distance from a surface, closest to the object side, of a most objectwise lens element in the first lens group to a surface, closest to the image side, of a most imagewise lens element in the fourth lens group, and OWDa is the overall distance in air from the object to the image when the relay optical system is being used at full magnification.

2. The relay optical system of claim 1, wherein the second lens group comprises, in order from the object side, a front lens subgroup having a positive refractive power and a rear lens subgroup having a negative refractive power and a focal length f2b, the relay optical system further satisfying the condition:

-0.75<f2/f2b<-0.45.

3. The relay optical system of claim 1, wherein the third lens group has a focal length f3 and comprises, in order from the object side, a front lens subgroup having a negative refractive power and a focal length f3b, and a rear lens subgroup having a positive refractive power, the relay optical system further satisfying the condition:

-0.75<f3/f3b<-0.45.

4. The relay optical system of claim 1, wherein the first lens group comprises, in order from the object side, a negative lens element and a positive lens element.

5. The relay optical system of claim 4, wherein the positive lens element in the first lens group is a positive meniscus lens element.

6. The relay optical system of claim 2, wherein the front lens subgroup of the second lens group comprises two positive lens elements each having a convex surface facing each other.

7. A relay optical system, comprising, in order from the object side to the image side:
 (a) first, second, third, and fourth lens groups, the second and third lens groups each having positive refractive power, and the first and fourth lens groups each having a negative refractive power;
 (b) an aperture stop disposed between the second and third lens groups, wherein the second lens group comprises a concave surface, facing the aperture stop, that is closest to the image side of all lens surfaces in the second lens group, and the third lens group comprises a concave surface, facing the aperture stop, that is closest to the object side of all lens surfaces in the third lens group;
 (c) relative to the aperture stop, the first lens group having a refractive power that is symmetrical with the fourth lens group and the second lens group having a refractive power that is symmetrical with the third lens group; and
 (e) the relay optical system having a focal length f and the first lens group having a focal length f1, the relay optical system satisfying the following conditions:

-0.3<f/f1<-0.1
0.85<ΣD/OWDa<1 wherein ΣD is the axial distance from a surface, closest to the object side, of a most objectwise lens element in the first lens group to a surface, closest to the image side, of a most imagewise lens element in the fourth lens group, and OWDa is the overall distance in air from the object to the image when the relay optical system is being used at full magnification.

8. The relay optical system of claim 7, having a magnification β and a numerical aperture NA, and the second lens group having a focal length f2 and comprising a rear lens having a focal length f2b, the relay optical system having further characteristics as follows:

| Surface No. | Curvature Radius | Interfacial Distance | Refractive Index (X) | Refractive index (Y) | Refractive Index (Z) |
|---|---|---|---|---|---|
| 1 | ∞ | 12.70 | 1.512797 | 1.513612 | 1.512059 |
| 2 | ∞ | 3.30 | | | |
| 3 | -500.24596 | 4.00 | 1.790930 | 1.793681 | 1.788511 |
| 4 | 77.32817 | 18.50 | | | |
| 5 | -294.33699 | 12.00 | 1.728609 | 1.730960 | 1.726541 |
| 6 | -87.59558 | 31.20 | | | |
| 7 | -354.84245 | 21.00 | 1.706538 | 1.707841 | 1.705364 |
| 8 | -78.90940 | 0.30 | | | |
| 9 | 82.10719 | 20.00 | 1.706538 | 1.707841 | 1.705364 |
| 10 | -734.20847 | 0.30 | | | |
| 11 | 57.23681 | 18.00 | 1.584404 | 1.585357 | 1.583545 |
| 12 | -186.62100 | 4.00 | 1.790930 | 1.793681 | 1.788511 |
| 13 | 37.52125 | 13.70 | | | |
| S | ∞ | 13.70 | | | |
| 14 | -37.52125 | 4.00 | 1.790930 | 1.793681 | 1.788511 |
| 15 | 186.62100 | 18.00 | 1.584404 | 1.585357 | 1.583545 |
| 16 | -57.23681 | 0.30 | | | |
| 17 | 734.20847 | 20.00 | 1.706538 | 1.707841 | 1.705364 |
| 18 | -82.10719 | 0.30 | | | |
| 19 | 78.90940 | 21.00 | 1.706538 | 1.707841 | 1.705364 |
| 20 | 354.84245 | 31.20 | | | |
| 21 | 87.59558 | 12.00 | 1.728609 | 1.730960 | 1.726541 |
| 22 | 294.33699 | 18.50 | | | |
| 23 | -77.32817 | 4.00 | 1.790930 | 1.793681 | 1.788511 |
| 24 | 500.24596 | 3.30 | | | |
| 25 | ∞ | 12.70 | 1.512797 | 1.513612 | 1.512059 |
| 26 | ∞ | 1.01 | | | |

Values for Conditional Expressions:

f = 51.72 mm
NA = 0.32
f1 = -260.19 mm
f2 = 69.59 mm
f2b = -111.51 mm
ΣD = 286.00 mm
OWDa = 311.40 mm
β = -1.0 X
f/f1 = -0.1988
f/f2 = 0.7432
f2/f2b = -0.6241
ΣD/OWDa = 0.9184

9. The relay optical system of claim 7, having a magnification β and a numerical aperture NA, and the second lens group having a focal length f2 and comprising a rear lens having a focal length f2b, the relay optical system further characteristics as follows:

| Surface No. | Curvature Radius | Interfacial Distance | Refractive Index (X) | Refractive index (Y) | Refractive Index (Z) |
|---|---|---|---|---|---|
| 30 | ∞ | 12.70 | 1.512802 | 1.513615 | 1.512066 |
| 31 | ∞ | 2.00 | | | |
| 32 | -684.98492 | 5.00 | 1.790843 | 1.793622 | 1.788390 |
| 33 | 90.83981 | 19.90 | | | |
| 34 | -155.98445 | 12.00 | 1.739564 | 1.741513 | 1.737835 |
| 35 | -81.13535 | 26.40 | | | |
| 36 | -291.02215 | 22.00 | 1.765243 | 1.766750 | 1.763894 |
| 37 | -78.87721 | 0.50 | | | |
| 38 | 80.15732 | 20.00 | 1.765243 | 1.766750 | 1.763894 |
| 39 | -1340.72570 | 3.00 | | | |
| 40 | 57.57686 | 18.00 | 1.584386 | 1.585345 | 1.583521 |
| 41 | -137.15029 | 4.00 | 1.790843 | 1.793622 | 1.788390 |
| 42 | 36.71642 | 13.50 | | | |
| S | ∞ | 13.50 | | | |
| 43 | -36.71642 | 4.00 | 1.790843 | 1.793622 | 1.788390 |
| 44 | 137.15029 | 18.00 | 1.584386 | 1.585345 | 1.583521 |
| 45 | -57.57686 | 3.00 | | | |
| 46 | 1340.72570 | 20.00 | 1.765243 | 1.766750 | 1.763894 |

| Surface No. | Curvature Radius | Interfacial Distance | Refractive Index (X) | Refractive index (Y) | Refractive Index (Z) |
|---|---|---|---|---|---|
| 47 | −80.15732 | 0.50 | | | |
| 48 | 78.87721 | 22.00 | 1.765243 | 1.766750 | 1.763894 |
| 49 | 291.02215 | 26.40 | | | |
| 50 | 81.13535 | 12.00 | 1.739564 | 1.741513 | 1.737835 |
| 51 | 155.98445 | 19.90 | | | |
| 52 | −90.83981 | 5.00 | 1.790843 | 1.793622 | 1.788390 |
| 53 | 684.96492 | 2.00 | | | |
| 54 | ∞ | 12.70 | 1.512802 | 1.513615 | 1.512066 |
| 55 | ∞ | 0.99 | | | | f = 59.03 mm
NA = 0.32
f1 = −273.21 mm
f2 = 64.42 mm
f2b = −101.90 mm
ΣD = 288.60 mm
OWDa = 311.38 mm
β = −1.0 X
f/f1 = 0.2161
f/f2 = 0.9164
f2/f2b = −0.6322
ΣD/OWDa = 0.9268

10. The relay optical system of claim 7, having a magnification α and a numerical aperture NA, and the second lens group having a focal length f2 and comprising a rear lens subgroup having a focal length f2b, the relay optical system having further characteristics as follows:

| Surface No. | Curvature Radius | Interfacial Distance | Refractive Index (X) | Refractive index (Y) | Refractive Index (Z) |
|---|---|---|---|---|---|
| 60 | ∞ | 12.70 | 1.512802 | 1.513615 | 1.512066 |
| 61 | ∞ | 2.00 | | | |
| 62 | 3588.45700 | 5.00 | 1.790843 | 1.793622 | 1.788390 |
| 63 | 69.81578 | 12.80 | | | |
| 64 | −173.60419 | 11.00 | 1.745850 | 1.748013 | 1.743937 |
| 65 | −87.04525 | 44.50 | | | |
| 66 | −1934.18480 | 19.00 | 1.690665 | 1.691901 | 1.689552 |
| 67 | −88.92216 | 0.20 | | | |
| 68 | 100.55292 | 18.00 | 1.690665 | 1.691901 | 1.689552 |
| 69 | −329.89164 | 0.20 | | | |
| 70 | 57.58631 | 16.00 | 1.584386 | 1.585345 | 1.583521 |
| 71 | 331.54986 | 1.50 | | | |
| 72 | 1345.02600 | 4.00 | 1.790843 | 1.793622 | 1.788390 |
| 73 | 40.76241 | 12.10 | | | |
| S | ∞ | 12.10 | | | |
| 74 | −40.76241 | 4.00 | 1.790843 | 1.793622 | 1.788390 |
| 75 | −1345.02600 | 1.50 | | | |
| 76 | −331.54986 | 16.00 | 1.584386 | 1.585345 | 1.583521 |
| 77 | −57.58631 | 0.20 | | | |
| 78 | 329.89164 | 18.00 | 1.690665 | 1.691901 | 1.689552 |
| 79 | −100.55292 | 0.20 | | | |
| 80 | 88.92216 | 19.00 | 1.690665 | 1.691901 | 1.689552 |
| 81 | 1934.18480 | 44.50 | | | |
| 82 | 87.04525 | 11.00 | 1.745850 | 1.748013 | 1.743937 |
| 83 | 173.60419 | 12.80 | | | |
| 84 | −69.81578 | 5.00 | 1.790843 | 1.793622 | 1.788390 |
| 85 | −3588.45700 | 2.00 | | | |
| 86 | ∞ | 12.70 | 1.512802 | 1.513615 | 1.512066 |
| 87 | ∞ | 1.02 | | | | f = 46.86 mm
NA = 0.32
f1 = −186.58 mm
f2 = 70.84 mm
f2b = −130.14 mm
ΣD = 288.60 mm
OWDa = 311.43 mm
β = −1.0 X
f/f1 = −0.2512
f/f2 = 0.6615
f2/f2b = −0.5455
ΣD/OWDa = 0.9267

11. A relay optical system, comprising in order from the object side:
 (a) first, second, third, and fourth lens groups, the second and third lens groups each having a positive refractive power and the first and fourth lens groups each having a negative refractive power, the second lens group comprising, in order from the object side, a front lens subgroup having a positive refractive power and a rear lens subgroup having a negative refractive power and a focal length f2b;
 (b) an aperture stop disposed between the second and third lens groups;
 (c) relative to the aperture stop, the first lens group being symmetrical with the fourth lens group and the second lens group being symmetrical with the third lens group; and
 (d) the relay optical system having a focal length f, the first lens group having a focal length f1, and the second lens group having a focal length f2, the relay optical system satisfying the following conditions:
 −0.3<f/f1<−0.1
 0.5<f/f2<1.1
 0.75<f2/f2b<−0.45.

12. The relay optical system of claim 11, wherein the third lens group comprises, in order from the object side, a front lens subgroup having a negative refractive power and a focal length f3b, and a rear lens subgroup having a positive refractive power, the relay optical system further satisfying the condition:
 −0.75<f3/f3b<−0.45.

13. The relay optical system of claim 12, further satisfying the condition:
 0.85<ΣD/OWDa<1
wherein ΣD is the axial distance from a surface, closest to the object side, of a most objectwise lens element in the first lens group to a surface, closest to the image side, of a most imagewise lens element in the fourth lens group, and OWDa is the overall distance in air from the object to the image when the relay optical system is being used at full magnification.

14. The relay optical system of claim 11, wherein the front lens subgroup of the second lens group comprises two positive lens elements each having a convex surface facing each other.

15. A relay optical system, comprising in order from the object side to the image side:
 (a) first, second, third, and fourth lens groups, the second and third lens groups each having a positive refractive power and the first and fourth lens groups each having a negative refractive power;
 (b) an aperture stop disposed between the second and third lens groups, wherein the second lens group comprises a concave surface, facing the aperture stop, that is closest to the image side of all lens surfaces in the second lens group, and the third lens group comprises a concave surface, facing the aperture stop, that is closest to the object side of all lens surfaces in the third lens group;

(c) relative to the aperture stop, the first lens group being symmetrical with the fourth lens group and the second lens group being symmetrical with the third lens group; and (d) the second lens group comprising, in order from the object side, a front lens subgroup having a positive refractive power and a rear lens subgroup having a negative refractive power and a focal length f2b;

(e) the relay optical system having a focal length f, the first lens group having a focal length f1, and the second lens group having a focal length f2, the relay optical system satisfying the following conditions:
$-0.3 < f/f1 < -0.1$
$0.5 < f/f2 < 1.1$
$-0.75 < f2/f2b < -0.45$.

16. The relay optical system of claim 15, wherein the front lens subgroup of the second lens group comprises two positive lens elements each having a convex surface facing each other.

17. A relay optical system, comprising in order from the object side to the image side:

(a) first, second, third, and fourth lens groups, the second and third lens groups each having a positive refractive power and the first and fourth lens groups each having a negative refractive power;

(b) an aperture stop disposed between the second and third lens groups;

(c) the second lens group comprising a concave surface, facing the aperture stop, that is closest to the image side of all lens surfaces in the second lens group;

(d) the third lens group having a focal length f3 and comprising (i) a concave surface, facing the aperture stop, that is closest to the object side of all lens surfaces in the third lens group, and (ii) in order from the object side, a front lens subgroup having a negative refractive power and a focal length f3b, and a rear lens subgroup having a positive refractive power;

(e) relative to the aperture stop, the first lens group being symmetrical with the fourth lens group and the second lens group being symmetrical with the third lens group; and (f) the relay optical system having a focal length f, the first lens group having a focal length f1, and the second lens group having a focal length f2, the relay optical system satisfying the following conditions:
$-0.3 < f/f1 < -0.1$
$0.5 < f/f2 < 1.1$
$-0.75 < f3/f3b < -0.45$.

18. The relay optical system of claim 17, further satisfying the condition:
$0.85 < \Sigma D/OWDa < 1$ wherein $\Sigma D$ is the axial distance from a surface, closest to the object side, of a most objectwise lens element in the first lens group to a surface, closest to the image side, of a most imagewise lens element in the fourth lens group, and OWDa is the overall distance in air from the object to the image when the relay optical system is being used at full magnification.

* * * * *

UNITED STATES PATENT AND TRADEMARK OFFICE
CERTIFICATE OF CORRECTION

PATENT NO. : 5,886,835
DATED : March 23, 1999
INVENTOR(S) : Suzuki et al.

It is certified that error appears in the above-identified patent and that said Letters Patent is hereby corrected as shown below:

Column 9, line 48, in Table 3, change the Curvature Radius for Surface No. 66 from "1934.18480" to -- -1934.18480 --.

Column 9, line 48, in Table 3, change the Refractive index (Y) for Surface No. 68 from "1.6919.01" to --1.691901--.

Column 9, line 57, in Table 3, change the Interfacial Distance for Surface No. 76 from "136.00" to --16.00--.

Column 10, line 17, in Table 3, Values for Conditional Expressions, "(2) F/f2 = 0.6615" should be --(2) f/f2 = 0.6615--.

Column 10, line 22, "O" should be --$\beta$--.

In the Claims:

Column 11, line 1, claim 1, "0.3 < f/f1 < -0.1" should be -- -0.3 < f/f1 < -0.1 --.

Column 13, line 10, claim 9, change the Curvature Radius for Surface No. 53 from "684.96492" to --684.98492--.

Column 13, line 28, claim 10, "$\alpha$" should be --$\beta$--.

UNITED STATES PATENT AND TRADEMARK OFFICE
CERTIFICATE OF CORRECTION

PATENT NO. : 5,886,835

DATED : March 23, 1999

INVENTOR(S) : Suzuki et al.

It is certified that error appears in the above-identified patent and that said Letters Patent is hereby corrected as shown below:

Column 14, line 6, claim 10, "$f2/f2b = -0.5455$" should be --$f2/f2b = -0.5444$--.

Column 14, line 32, claim 11, "$0.75 < f2/f2b < -0.45$" should be -- $-0.75 < f2/f2b < -0.45$ --.

Signed and Sealed this

Twenty-eighth Day of March, 2000

Attest:

Q. TODD DICKINSON

*Attesting Officer*     *Commissioner of Patents and Trademarks*